(12) United States Patent
Takao et al.

(10) Patent No.: US 7,390,099 B2
(45) Date of Patent: Jun. 24, 2008

(54) HARD-COATED ANTIGLARE FILM AND METHOD OF MANUFACTURING THE SAME

(75) Inventors: Hiroyuki Takao, Ibaraki (JP); Daisuke Hamamoto, Ibaraki (JP); Katsunori Takada, Ibaraki (JP); Seiichi Kusumoto, Ibaraki (JP); Yuuichi Kimura, Ibaraki (JP); Takayuki Shigematsu, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/312,686

(22) Filed: Dec. 21, 2005

(65) Prior Publication Data

US 2006/0132922 A1    Jun. 22, 2006

(30) Foreign Application Priority Data

Dec. 22, 2004 (JP) ............................ 2004-370640
Apr. 26, 2005 (JP) ............................ 2005-127339
Jul. 15, 2005 (JP) ............................ 2005-206995

(51) Int. Cl.
G02B 27/00    (2006.01)

(52) U.S. Cl. ..................................................... 359/601

(58) Field of Classification Search ................. 359/601; 428/451
See application file for complete search history.

(56) References Cited

U.S. PATENT DOCUMENTS 6,888,593 B1 * 5/2005 Nakamura et al. ............ 349/96
7,037,573 B2   5/2006 Miyatake et al.
2004/0184154 A1 * 9/2004 Ito ............................. 359/599
2004/0265602 A1 * 12/2004 Kobayashi et al. .......... 428/458
2005/0255291 A1 * 11/2005 Iwata et al. ................. 428/141

FOREIGN PATENT DOCUMENTS

| JP | 11-286083 | 10/1999 |
| JP | 2000-326447 | 11/2000 |
| JP | 2001-194504 | 7/2001 |
| JP | 2001-264508 | 9/2001 |
| JP | 2001-343529 | 12/2001 |
| JP | 2004-167827 | 6/2004 |
| JP | 2004-203683 | 7/2004 |
| WO | WO 03/079059 A1 | 9/2003 |

OTHER PUBLICATIONS

Chinese Office Action dated Sep. 28, 2007 issued in corresponding Application No. 200510133834.0.

* cited by examiner

*Primary Examiner*—Joshua L Pritchett
(74) *Attorney, Agent, or Firm*—Westerman, Hattori, Daniels & Adrian, LLP.

(57) ABSTRACT

There are provided a hard-coated antiglare film with high hardness, high scratch resistance and good antiglare properties, a method of manufacturing the film, an optical element using the film, and an image display including the film or the optical element. The hard-coated antiglare film of the invention includes a transparent film substrate and a hard-coating layer that contains fine particles and is formed on at least one side of the transparent film substrate, wherein the hard-coating layer has a thickness of 15 μm to 30 μm, the fine particles have an average particle size of 30% to 75% of the thickness of the hard-coating layer, and the fine particles form unevenness with a θa value of 0.4° to 1.5° according to JIS B 0601.

21 Claims, 1 Drawing Sheet

HARD-COATED ANTIGLARE FILM AND METHOD OF MANUFACTURING THE SAME

FIELD OF THE INVENTION

The invention relates to a hard-coated antiglare film comprising a transparent film substrate and a hard-coating layer formed on at least one side of the film substrate and to a method of manufacturing the same. More specifically, the invention relates to a hard-coated antiglare film that can be suitably used for optical devices such as polarizing plates and image displays such as cathode ray tubes (CRTs), liquid crystal displays (LCDs), plasma display panels (PDPs) and electroluminescence displays (ELDs) and to a method of manufacturing the same.

BACKGROUND OF THE INVENTION

As LCDs, one of many types of image displays, have been technically improved to provide wide viewing angles, high resolution, high response, good color reproduction, and the like, applications of LCDs are spreading from laptop personal computers and monitors to television-sets. In a basic LCD structure, a pair of flat glass substrates each provided with a transparent electrode are opposed via a spacer to form a constant gap, between which a liquid crystal material is placed and sealed to form a liquid crystal cell, and a polarizing plate is formed on the outside surface of each of the pair of glass substrates. In a conventional technique, a glass or plastic cover plate is attached to the surface of a liquid crystal cell in order to prevent scratches on a polarizing plate bonded to the surface of the liquid crystal cell. However, the placement of such a cover plate is disadvantageous in terms of cost and weight. Thus, a hard-coating process has gradually been used to treat the surface of polarizing plates.

When hard-coating treatment is performed on a transparent plastic film substrate to produce a hard-coated film, thermo-setting resins or ionizing radiation-curable resins such as ultraviolet (UV)-curable resins are generally used to form a thin hard-coating layer with a thickness of about 2 to 10 µm on the transparent plastic film. If such resins are applied to a glass material, the resulting hard-coating layer can exhibit a pencil hardness of 4H or more. If a hard-coating layer with an insufficient thickness is formed on a transparent plastic film substrate, however, the pencil hardness of the layer can be generally affected by the substrate and reduced to 3H or less.

LCD applications have come to include home television sets, and thus it is easily expected that the users of general home television sets should handle LCD television sets in the same manner as in the case of glass CRT television sets. Glass CRTs have a pencil hardness of about 9H, which significantly differs from that of current hard-coated films. Thus, hard-coated films have been required to have higher hardness, even if it cannot reach a pencil hardness of 9H.

An increase in the hardness of hard-coated films is possible by increasing the thickness of their hard-coating layer. However, the increase in layer thickness can cause a problem in that the particles are completely buried in the hard-coating layer and cannot provide sufficient antiglare properties. The addition amount of the fine particles may be increased to improve the antiglare properties, but in such a method, the number of the particles is increased in the layering direction, which causes a problem of high haze value. Recently, therefore, methods for overcoming the drawbacks of trying to achieve high hardness of hard-coated films, such as antiglare properties and an increase in haze value, have been proposed, as disclosed in Japanese Patent Application Laid-Open (JP-A) Nos. 11-286083, 2000-326447, 2001-194504, and 2001-264508.

JP-A No. 11-286083 discloses an antiglare film comprising a transparent substrate film and a hard-coating layer that is formed on the transparent substrate film and mainly composed of particles with an average particle size of 0.6 to 20 µm, fine particles with an average particle size of 1 to 500 nm and a hard-coating resin. It also discloses that the thickness of the hard-coating layer is at most the particle size of the particles, preferably at most 80% of the average particle size (specifically at most 16 µm). However, such a thickness of the hard-coating layer has a problem in that sufficient hardness cannot be provided.

JP-A No. 2000-326447 discloses a hard-coated film comprising a plastic substrate film and at least one hard-coating layer formed on at least one side of the substrate film, wherein the hard-coating layer has a thickness of 3 to 30 µm, and the hard-coating layer contains inorganic fine particles with secondary particle sizes of at most 20 µm. It also discloses that the surface of the hard-coating layer is provided with unevenness so as to provide antiglare properties. Such a structure is, however, designed regardless of surface roughness of the hard-coating layer, and the structure having inorganic fine particles completely buried in the hard-coating layer has a problem in that sufficient antiglare properties cannot be provided.

JP-A No. 2001-194504 discloses an antireflection film comprising a plastic film and a laminate that is formed on at least one side of the plastic film and comprises a hard-coating layer and a thin antireflection film layer mainly composed of a metal alkoxide and a hydrolysate thereof, wherein the hard-coating layer has an elastic modulus of 0.7 to 5.5 GPa at its breaking strain or lower. It also discloses that the hard-coating layer has a thickness of 0.5 µm to 20 µm and that the hard-coating layer contains fine particles with an average particle size of 0.01 to 10 µm. According to the technique disclosed in JP-A No. 2001-194504, although hardness and scratch resistance can be improved, there is a problem in that fine particles are completely buried in the hard-coating layer and can not provide sufficient antiglare properties, for example, when fine particles with an average particle size of about 1.8 µm are added to a hard-coating layer with a thickness of about 20 µm.

JP-A No. 2001-264508 discloses an antiglare antireflection film comprising a transparent support and a laminate that is formed on the support and sequentially comprises an antiglare hard-coating layer containing particles with an average particle size of 1 to 10 µm and a low-refractive-index layer with a refractive index of 1.35 to 1.49 produced with a composition containing inorganic fine particles with an average particle size of 0.001 to 0.2 µm, a hydrolysate of a photocurable organosilane and/or a partial condensate thereof, and a fluoropolymer, wherein the antiglare antireflection film has a haze value of 3 to 20% and an average reflectance of at most 1.8% at wavelengths of 450 nm to 650 nm. It also discloses that the antiglare hard-coating layer has a thickness of 1 to 10 µm. The invention disclosed in JP-A No. 2001-264508 has a problem in that sufficient hardness is not provided, while it is provided for the purpose of improving scratch resistance, antiglare properties or the like.

SUMMARY OF THE INVENTION

The invention has been made in view of the above problems, and it is an object of the invention to provide a hard-coated antiglare film with high hardness, scratch resistance and good antiglare properties, a method of manufacturing the film, an optical element using the film, and an image display including the film or the optical element.

In order to solve the problems with the conventional techniques, the inventors have made active investigations on hard-coated antiglare films, methods for manufacturing them, optical elements using them, and image displays including them, and have finally found that the object can be achieved using the feature as described below, leading to the completion of the invention.

In order to solve the above problems, the invention is directed to a hard-coated antiglare film, including: a transparent film substrate; and a hard-coating layer that contains fine particles and is formed on at least one side of the transparent film substrate, wherein the hard-coating layer has a thickness of 15 µm to 30 µm, the fine particles have an average particle size of 30% to 75% of the thickness of the hard-coating layer, and the fine particles form unevenness with a θa value of 0.4° to 1.5° according to JIS B 0601.

According to this feature, the hard-coating layer with a thickness of 15 to 30 µm has a structure prevented from having insufficient hardness. The hard-coating layer contains fine particles with an average particle size of 30% to 75% of its thickness. The fine particles form unevenness with a θa value of 0.4° to 1.5°. The fine particles have relatively large particle sizes with respect to the thickness of the hard-coating layer. Thus, at least some of the fine particles are allowed to project from the surface part of the hard-coating layer, so that good antiglare properties can be provided. It is also possible to prevent a reduction in scratch resistance, which would otherwise be caused when fine particles with smaller sizes less susceptible to gravitational sedimentation are used. According this feature, there can be provided hard-coated antiglare films with high hardness, good antiglare properties and high scratch resistance.

The hard-coating layer is preferably made from a material containing a urethane acrylate, a polyol(meth)acrylate and a (meth)acrylic polymer having an alkyl group containing at least two hydroxyl groups.

According to this feature, the urethane acrylate-containing material can impart elasticity and flexibility to the hard-coating layer. The material also containing the polyol (meth)acrylate can produce a hard-coating layer with higher hardness. The material further containing a (meth)acrylic polymer having a 3-hydroxypropyl group can produce a hard-coating layer in which hardening and shrinking are alleviated and curling is suppressed.

The polyol (meth)acrylate preferably comprises pentaerythritol triacrylate and pentaerythritol tetraacrylate.

According this feature, curling can further be suppressed, while high hardness and good flexibility are retained.

At least one antireflection layer is preferably formed on the hard-coating layer.

According this feature, the antireflection layer formed on the outer surface of the hard-coating layer can reduce reflection of light on the interface between the hard-coating layer and air. When used in image displays or the like, the hard-coated antiglare film with this feature can prevent a reduction in visibility of the image on the display screen.

The antireflection layer also preferably contains hollow spherical silicon oxide ultrafine particles.

The hard-coated antiglare film preferably has a glossiness of 50 to 95 according to JIS K 7105. The "glossiness" means the 60° specular gloss according to JIS K 7105 (1981 version).

In order to solve the above problems, the invention is also directed to a method of manufacturing a hard-coated antiglare film including a transparent film substrate and a hard-coating layer formed on at least one side of the substrate, which includes the steps of: preparing a hard-coating material, wherein fine particles having an average particle size of 30% to 75% of the thickness of the hard-coating layer are added to prepare the hard-coating material; applying the hard-coating material to at least one side of the film substrate to form a coating film; and curing the coating film to form a hard-coating layer having a thickness of 15 µm to 30 µm and unevenness with a θa value of 0.4° to 1.5° according to JIS B 0601, wherein the fine particles form the unevenness.

According to this method, a hard-coating layer with a thickness of 15 to 30 µm is formed, and thus a hard-coated antiglare film with sufficient hardness can be produced. Since the fine particles used in this method have an average particle size of 30% to 75% of the thickness of the hard-coating layer, the resulting hard-coating layer can have a structure in which at least some of the fine particles project from the surface even though most of them are buried in the hard-coating layer. In addition, the hard-coating layer is formed so as to provide a θa value of 0.4° to 1.5°, so that good antiglare properties can be produced. The fine particles used in this method have relatively large particle sizes with respect to the thickness of the hard-coating layer. Thus, it is also possible to prevent a reduction in scratch resistance, which would otherwise be caused when fine particles with smaller sizes less susceptible to gravitational sedimentation are used. According this method, therefore, hard-coated antiglare films with high hardness, good antiglare properties and high scratch resistance can be produced.

The hard-coating material preferably uses an ethyl acetate-containing dilution solvent.

This enables the production of a hard-coating layer that has good adhesion to the film substrate and is less susceptible to peeling from the film substrate.

The content of the ethyl acetate is also preferably 20% by weight or more. This enables the production of a hard-coating layer with further increased adhesion to the film substrate.

In order to solve the above problems, the invention is also directed to an optical element including an optical member and the hard-coated antiglare film formed on at least one side of the optical member.

In order to solve the above problems, the invention is also directed to a polarizing plate including the hard-coated antiglare film.

In order to solve the above problems, the invention is also directed to a polarizing plate including a polarizer and the hard-coated antiglare film formed on at least one side of the polarizer.

In order to solve the above problems, the invention is also directed to an image display including the hard-coated antiglare film, the optical element or the polarizing plate.

The invention with the above means can provide the following advantages.

According to the invention, there can be provided hard-coated antiglare films with high hardness, good antiglare properties and high scratch resistance. When used, for example, in various types of optical elements or image displays, such hard-coated antiglare films can provide good antiglare effects and block outside light or the like from glare while preventing scratches on the devices.

DESCRIPTION OF THE EMBODIMENTS

Figure 1:
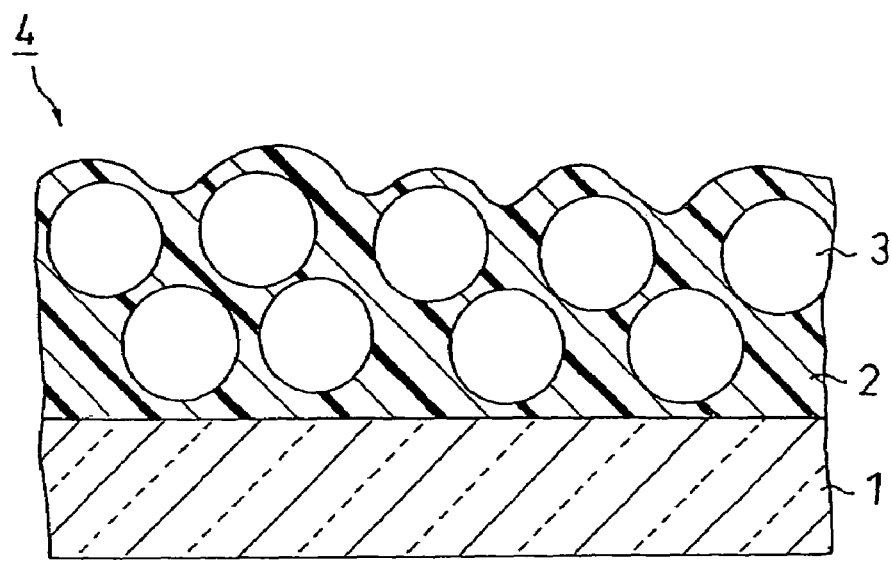
FIG. 1 is a cross-sectional view schematically showing a hard-coated antiglare film according to an embodiment of the invention.

Some embodiments of the invention are described below with reference to the drawings. FIG. 1 is a crass-sectional view schematically showing a hard-coated antiglare film according to an embodiment of the invention.

Referring to FIG. 1, a hard-coated antiglare film 4 comprises a transparent film substrate 1 and a hard-coating layer 2 formed on one side of the film substrate 1. Although not shown in FIG. 1, the hard-coating layer 2 may be formed on both sides of the film substrate 1. While FIG. 1 shows an example where the hard-coating layer 2 is monolayer, the hard-coating layer according to the invention may comprise two or more layers.

The film substrate 1 may be any material that has high visible-light transmittance (preferably a light transmittance of at least 90%) and good transparency (preferably a haze value of at most 1%). As examples of the transparent polymer forming of the above-mentioned transparent substrate film, for example, polyester type polymers, such as polyethylene terephthalate and polyethylenenaphthalate; cellulose type polymers, such as diacetyl cellulose and triacetyl cellulose; polycarbonate type polymer; acrylics type polymer, such as poly methylmethacrylate may be mentioned. And as the polymer forming transparent substrate, styrene type polymers, such as polystyrene and acrylonitrile-styrene copolymer; olefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially in optical property, a film having small birefringence is suitably used. The hard-coated antiglare film 4 according to the embodiment may be used as a protective film for a polarizing plate. In such a case, the film substrate 1 is preferably made of triacetyl cellulose, polycarbonate, an acrylic polymer, or a polyolefin having a cyclic or norbornene structure. The film substrate 1 may also be a polarizer itself as described later. Such a structure does not need a protective layer of TAC or the like and provides a simple polarizing plate structure and thus allows a reduction in manufacturing steps and an increase in production efficiency. In addition, thinner polarizing plates can also be provided. When the film substrate 1 is a polarizer, the hard-coating layer 2 serves as a protective layer in a conventional manner. The hard-coated film also functions as a cover plate, when attached to the surface of a liquid crystal cell.

A thickness of the film substrate 1 is determined appropriately, and in general, it is approximately 10 to 500 μm so that it may have suitable thinness, or in viewpoint of workability, such as strength and handling property. Especially it is preferably 20 to 300 μm, and more preferably 30 to 200 μm. While the film substrate 1 may have any refractive index, it generally has a refractive index of about 1.30 to about 1.80, particularly preferably of 1.40 to 1.70.

The hard-coating layer 2 is made from a hard-coating material comprising (A) a urethane acrylate (A), a polyol (meth)acrylate (B) and a (meth)acrylic polymer (C) having an alkyl group containing at least two hydroxyl groups.

The urethane acrylate (A) may comprise components derived from (meth)acrylic acid and/or its ester, a polyol, and a diisocyanate. For example, the urethane acrylate is prepared by a process including the steps of making a hydroxy(meth)acrylate having at least one hydroxyl group from (meth)acrylic acid and/or its ester and a polyol and allowing the hydroxy(meth)acrylate to react with a diisocyanate. The term "(meth)acrylic acid" means acrylic acid and/or methacrylic acid, and "(meth)" has the same meaning with respect to the invention. Each of these components may be of a single type or a combination of two or more types.

Examples of esters of (meth)acrylic acid include alkyl (meth)acrylates such as methyl (meth)acrylate, ethyl (meth)acrylate, propyl (meth)acrylate, isopropyl (meth)acrylate, and butyl (meth)acrylate; and cycloalkyl (meth)acrylates such as cyclohexyl (meth)acrylate.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decaneglycol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, tri(di)methylolpropane, glycerin, 3-methylpentane-1,3,5-triol, pentaerythritol, dipentaerythritol, tripentaerythritol, and glucoses.

The diisocyanate may be any type of aromatic, aliphatic or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4 -diphenylmethane diisocyanate, and hydrogenated derivatives thereof.

Too small addition amounts of the urethane acrylate (A) lead to a reduction in flexibility or adhesion of the resulting hard-coating layer, while too large addition amounts thereof lead to a reduction in hardness of the hard-coating layer after curing. In all the resin components of the hard-coating material (the total amount of Components A, B and C and optionally an additional resin material(s) and the like), therefore, the content of the urethane acrylate (A) is preferably from 15% by weight to 55% by weight, more preferably from 25% by weight to 45% by weight. If the content of the urethane acrylate (A) in all the resin components of the hard-coating material is more than 55% by weight, the hard coating performance can be degraded in some unfavorable cases. If the content is less than 15% by weight, flexibility or adhesion cannot be improved in some unfavorable cases.

Examples of the component of the polyol (meth)acrylate (B) include pentaerythritol di(meth)acrylate, pentaerythritol tri(meth)acrylate, pentaerythritol tetra(meth)acrylate, dipentaerythritol hexa(meth)acrylate, and 1,6-hexanediol (meth)acrylate. A particularly preferred polyol (meth)acrylate contains a monomer component comprising a polymer of pentaerythritol triacrylate and pentaerythritol tetraacrylate. A component mixture containing pentaerythritol triacrylate and pentaerythritol tetraacrylate is also particularly preferred.

Based on the amount of the urethane acrylate (A), the blending amount of the polyol (meth)acrylate (B) is preferably from 70% by weight to 180% by weight, more preferably from 100% by weight to 150% by weight. If the blending amount of the polyol (meth)acrylate (B) is more than 180% by weight based on the amount of the urethane acrylate (A), hardening and shrinking of the hard-coating layer can be significant so that the hard-coated film can significantly curl or its flexibility can be reduced in some unfavorable cases. If the amount is less than 70% by weight, the hard coating properties such as hardness and scratch resistance can be degraded in some unfavorable cases. Practically, the scratch resistance value should preferably in the range of 0 to 0.7, more preferably in the range of 0 to 0.5. If the blending amount of the polyol (meth)acrylate (B) is within the above range, the scratch resistance value can be set within the stated range. How to calculate the scratch resistance value will be described later in the section of Examples.

The (meth)acrylic polymer (C) has an alkyl group containing at least two hydroxyl groups. More specifically, the (meth)acrylic polymer (C) may be a (meth)acrylic polymer having a 2,3-dihydroxypropyl group, which is represented by Chemical Formula (1) below, or a (meth)acrylic polymer having a 2-hydroxyethyl group and a 2,3-dihydroxypropyl group, whose molecule has a repeating unit in Chemical Formula (1) below and another repeating unit represented by Chemical Formula (2) below.

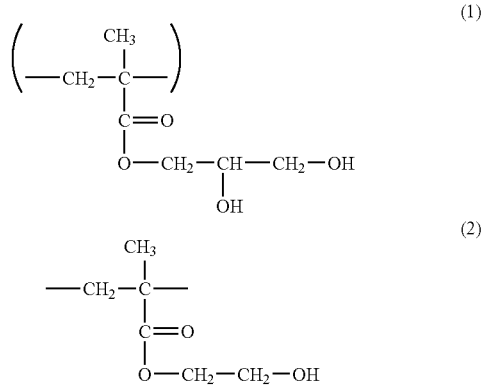

Based on the amount of the urethane acrylate (A), the addition amount of the (meth)acrylic polymer (C) having an alkyl group containing at least two hydroxyl groups is preferably from 25% by weight to 110% by weight, more preferably from 45% by weight to 85% by weight. If the amount is more than 110% by weight, the coating properties can be degraded in some unfavorable cases. If the amount is less than 25% by weight, curling can significantly increase in some unfavorable cases.

According to the invention, the addition of the (meth) acrylic polymer (C) allows suppression of hardening and shrinking of the hard-coating layer 2 and thus leads to the prevention of curling. In view of the production of the hard-coated film and the like, curling should preferably be controlled within 30 mm or less. If curling is controlled within such a range, workability and production efficiency can be further improved.

The hard-coating layer 2 contains fine particles 3, which mainly function as antiglare fine particles to impart antiglare properties. The fine particles 3 may be classified into inorganic and organic fine particles. The inorganic fine particles may be made of any material such as silicon oxide, titanium oxide, aluminum oxide, zinc oxide, tin oxide, calcium carbonate, barium sulfate, talc, kaolin, and calcium sulfate. The organic fine particles may also be any material such as poly-methyl methacrylate acrylate resin powder, silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. Two or more of these types of inorganic and organic fine particles may be used at the same time.

The average particle size of the fine particles 3 is from 30% to 75% of the thickness of the hard-coating layer 2, more preferably from 30% to 50% of the thickness. If the average particle size is less than 30% of the thickness, sufficient unevenness cannot be formed on the surface, so that disadvantageously, sufficient antiglare function cannot be provided. On the other hand, if the average particle size is more than 75% of the thickness, the steps of the surface unevenness can be so large that disadvantageously, the appearance can be degraded or reflected light can be strongly scattered to produce white blurring.

The blending amount of the fine particles 3 may be set at any appropriate value without any particular limitation. Specifically, based on 100 parts by weight of the hard-coating material, the amount of the fine particles 3 is preferably from 2 to 70 parts by weight, more preferably from 4 to 50 parts by weight, particularly preferably from 15 to 40 parts by weight.

In order to reduce light scattering on the interface between the fine particles 3 and the hard-coating layer 2 as much as possible, the difference between the refractive indexes of the fine particles 3 and the hard-coating layer 2 should be small. The hard-coating layer 2 generally has a refractive index of 1.4 to 1.6. Thus, the fine particles 3 preferably use organic fine particles with a refractive index close to that of the hard-coating layer 2 or inorganic silicon oxide fine particles with a refractive index close to that of the hard-coating layer 2. The difference between the refractive indexes of the hard-coating layer 2 and the fine particles 3 is preferably less than 0.05. If the difference is 0.05 or more, light scattering can be strong, so that failures such as unsharpness of displayed contents can occur, for example, in the case of applications in image displays.

The fine particles 3 may have any shape and may be in the form of substantially spherical beads or may be of indefinite shape such as powder. A single type or two or more types of fine particles may be appropriately selected and used. The fine particles 3 preferably have a substantially spherical shape with an aspect ratio of at most 1.5. Substantially spherical or polygonal particles with an aspect ratio of more than 1.5 can complicate the control of the unevenness θa formed of the fine particles 3 in some cases.

The average tilt angle θa of the hard-coating layer 2 needs to be from 0.4° to 1.5°. If θa is less than 0.4°, sufficient antiglare properties cannot be produced, and outside light or the like can disadvantageously cause glare. On the other hand, if θa is more than 1.5°, the haze value can disadvantageously increase. Within the above range, the hard-coating layer 2 can provide an improved antiglare effect and appropriately block outside light or like from glare. The average tilt angle θa is a value obtained by the method according to JIS B 0601.

The difference (d) between the refractive indexes of the film substrate 1 and the hard-coating layer 2 is preferably at most 0.04, more preferably at most 0.02. When a polyethylene terephthalate film with a refractive index of about 1.64 is used as the film substrate 1, about 35% of titanium oxide ultrafine particles with particle sizes of at most 100 nm in all the resin components of the hard-coating material can control d to 0.02 or less and prevent the occurrence of interference fringes.

When a triacetyl cellulose film with a refractive index of about 1.48 is used as the film substrate 1, about 40% of silicon oxide ultrafine particles with particle sizes of at most 100 nm in all the resin components of the hard-coating material can similarly control d to 0.02 or less and prevent the occurrence of interference fringes.

The thickness of the hard-coating layer 2 is preferably from 15 to 30 μm, more preferably from 18 to 25 μm. Even at a lower limit of thickness of 15 μm, the hard-coating layer 2 using the polyol (meth)acrylate (B) can retain at least a certain level of hardness (for example, a pencil hardness of at least 4H). Even at an upper limit of thickness of 25 μm for a further increase in hardness, the hard-coating layer 2 using the urethane acrylate (A) and the (meth)acrylic polymer (C) having an alkyl group containing at least two hydroxyl groups can be sufficiently prevented from curling, cracking or the like. If the thickness is less than 15 μm, the hardness of the hard-coating layer can be degraded. On the other hand, a thickness of more than 30 μm can cause a practical problem in which the hard-coating layer itself can be cracked, or the hard-coated film can curl toward the hard-coating surface side due to hardening and shrinking of the hard-coating layer.

Various types of solvents may be used as the dilution solvent for the hard-coating material. Examples of such solvents include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone, diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone, 2-octanone, 2-pentanone, 2-hexanone, 2-heptanone, and 3-heptanone. One of these solvents or any combination of two or more of these solvents may be used. The content of ethyl acetate in all the dilution solvents is preferably at least 20% by weight, more preferably at least 25% by weight, particularly preferably from 30% by weight to 70% by weight. When triacetyl cellulose is used for the film substrate 1, such a content of ethyl acetate allows the production of a hard-coating layer 2 with particularly high adhesion. If the content of ethyl acetate in all the dilution solvents is more than 70% by weight, the rate of volatilization can be high so that unevenness in coating or drying can easily occur. If the content is less than 20% by weight, the adhesion to the substrate can be degraded in some unfavorable cases.

For example, the surface unevenness of the hard-coating layer 2 may be formed by a process including the step of previously roughening the surface of the film for use in the production of the hard-coating layer 2 by an appropriate method such as sand blasting, roll embossing, and chemical etching to form fine unevenness on the film surface in combination with a process including the step of forming fine unevenness on the surface of the material directly forming the hard-coating layer 2.

Various types of leveling agents may be added to the hard-coating material. The leveling agent may be appropriately a fluorochemical or silicone leveling agent, more preferably a silicone leveling agent such as a reactive silicone, polydimethylsiloxane, polyether-modified polydimethylisloxane, and polymethylalkylsiloxane. Among these silicone leveling agents, the reactive silicone is particularly preferred. The reactive silicone added can impart lubricity to the surface and produce continuous scratch resistance. When a low refractive index layer containing a siloxane component is used, a hydroxyl-containing reactive silicone can increase adhesion.

For example, the reactive silicone leveling agent may be a compound having a siloxane bond and an acrylate group and a hydroxyl group. Specific examples of such a compound include:
(1) copolymers of dimethylsiloxane/methyl, 3-acryloyl-2-hydroxypropoxypropylsiloxane/methyl, and 2-acryloyl-3-hydroxypropoxypropylsiloxane (0.8:0.16:0.04 in molar ratio);
(2) copolymers of dimethylsiloxane, hydroxypropylsiloxane, (6-isocyanate-hexyl)isocyanuric acid, and aliphatic polyester (6.3:1.0:2.2:1.0 in molar ratio); and
(3) copolymers of dimethylsiloxane, acrylate-terminated methyl polyethylene glycol propyl ether siloxane, and hydroxyl-terminated methyl polyethylene glycol propyl ether siloxane (0.88:0.07:0.05 in molar ratio).

The blending amount of the leveling agent is preferably at most 5 parts by weight, more preferably in the range of 0.01 to 5 parts by weight, based on 100 parts by weight of all the resin components of the hard-coating material.

In a case where ultraviolet light is used to cure the hard-coating material, the leveling agent in the hard-coating material can bleed to the air interface during the steps of pre-drying and drying off the solvent so that the effect of inhibiting curing of UV-curable resin by oxygen can be blocked and that a hard-coating layer 2 having sufficient hardness even at the uppermost surface can be obtained. The silicone leveling agent can also bleed to the surface of the hard-coating layer 2 to provide lubricity and thus can increase scratch resistance.

If necessary, the material for forming the hard-coating layer 2 may contain a pigment, a filler, a dispersing agent, a plasticizer, a ultraviolet absorbing agent, a surfactant, an antioxidant, a thixotropy-imparting agent, or the like, as long as the performance is not degraded. One of these additives may be used alone, or two or more of these additives may be used together.

In an embodiment of the invention, the hard-coating material may contain any conventional photopolymerization initiator. Examples of applicable initiators include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, and other thioxanthone compounds.

A process of forming the hard-coating layer 2 includes the steps of applying, to the film substrate 1, the hard-coating material that contains at least the urethane acrylate (A), the polyol (meth)acrylate (B) and the (meth)acrylic polymer (C) having an alkyl group containing at least two hydroxyl groups, and then curing the material. The hard-coating material may be applied in the form of a solvent solution. The applied solution of the hard-coating material is dried and then cured.

The hard-coating material may be applied to the film substrate 1 by any conventional coating method such as fountain coating, die coating, spin coating, spray coating, gravure coating, roll coating, and bar coating.

While the hard-coating material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably from 50 to 5000 mJ/cm$^2$ in terms of accumulative exposure at an ultraviolet wavelength of 365 nm. If the amount of irradiation is less than 50 mJ/cm$^2$, curing can be insufficient so that the hardness of the hard-coating layer can be degraded in some cases. Beyond 5000 mJ/cm$^2$, the hard-coating layer can be colored and have reduced transparency in some cases.

Figure 2:
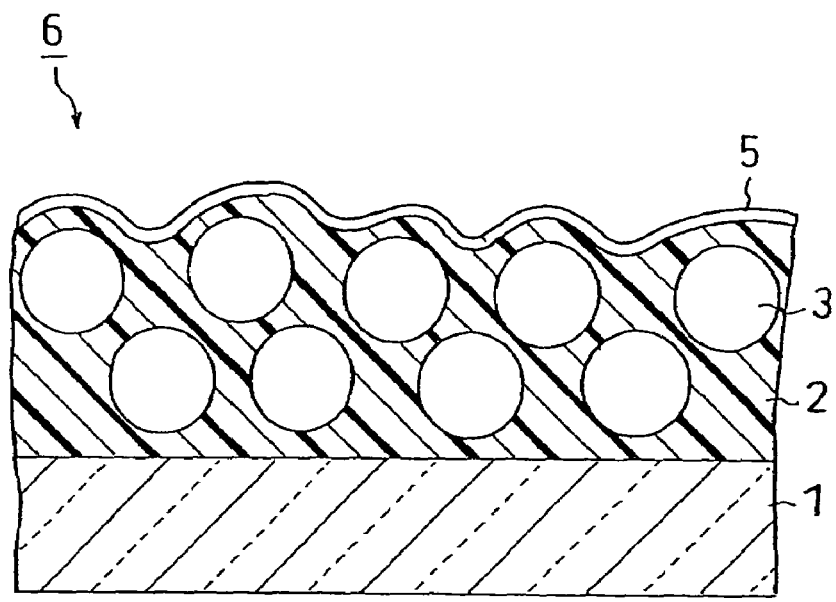
FIG. 2 is a cross-sectional view schematically showing a hard-coated antiglare antireflection film according to another embodiment of the invention.

As shown in FIG. 2, an antireflection layer 5 may be formed on the hard-coating layer 2 to form a hard-coated antireflection antiglare film 6. FIG. 2 is a cross-sectional view schematically showing a hard-coated antireflection antiglare film 6 according to an embodiment of the invention. Light incident on an object undergoes reflection on the interface, absorption and scattering in the interior and any other phenomena until it goes through the object and reaches the back side. Light reflection at the interface between air and a hard-coating layer is one of the factors in the reduction in visibility of the image on a display equipped with the hard-coated film. The antireflection layer 5 reduces such surface reflection. Although not shown in FIG. 2, the hard-coating layer 2 and the antireflection layer 5 may be formed on both sides of the film substrate 1. While a single hard-coating layer 2 and a single antireflection layer 5 are illustrated in FIG. 2, the antireflection layer 5 may comprise two or more layers as long as the hard-coating layer is provided according to the invention. The antireflection layer 5 may be a thin optical film that is stacked on the surface of the hard-coating layer 2 so as to have strictly controlled thickness and refractive index. In this technique, the antireflection function is produced by allowing opposite phases of incident light and reflected light to cancel each other out based on interference of light.

When the antireflection layer 5 is designed based on interference of light, the interference effect can be enhanced by a method of increasing the difference between the refractive indexes of the antireflection layer 5 and the hard-coating layer 2. A laminate of two to five thin optical films (each with strictly controlled thickness and refractive index) may be stacked on a substrate to form an antireflection multilayer. In such a case, components of different refractive indexes are generally used to form a plurality of layers with a certain thickness. Thus, the antireflection layer 5 can be optically designed at a higher degree of freedom, the antireflection effect can be enhanced, and it may be possible to make the spectral reflection characteristics flat in the visible light range. Since each layer of the thin optical film must be precise in thickness, a dry process such as vacuum deposition, sputtering, and CVD is generally used to form each layer.

The hard-coating material may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard-coating layer, and a low-refractive-index silicon oxide layer (refractive index: about 1.45), which is formed on the titanium oxide layer. Also preferred is a four-layer laminate comprising the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

The antireflection effect can also be produced by stacking a thin monolayer optical film on the film substrate 1. In the design of a single antireflection layer 5, the difference between the refractive indexes of the antireflection layer 5 and the hard-coating layer 2 should be large for the maximum antireflection function. Concerning the thickness (d) of the antireflection layer 5, the refractive index (n) and the wavelength ($\lambda$) of incident light, the relation nd=$\lambda$/4 is established. If the antireflection layer 5 is a low-refractive-index layer having a refractive index lower than that of the film substrate 1, its reflectance can be minimum under the conditions that the relation should be established. For example, if the refractive index of the antireflection layer 5 is 1.45, the antireflection layer 5 with a thickness of 95 nm can have a minimum reflectance at a wavelength of 550 nm with respect to an incident beam of visible light.

The antireflection function should be produced in the visible light wavelength range of 380 to 780 nm, and the visibility is particularly high in the wavelength range of 450 to 650 nm. The layer is generally designed to have a minimum reflectance at the center wavelength 550 nm of the range.

In the design of a single antireflection layer 5, its thickness accuracy may be less strict than that of the antireflection multilayer and may be in the range of the design thickness ±10%. In a case where the design thickness is 95 nm, for example, the layer with a thickness in the range of 86 nm to 105 nm can be used without problems. Thus, a single antireflection layer 5 is generally formed using a wet process such as fountain coating, die coating, spin coating, spray coating, gravure coating, roll coating, and bar coating.

Examples of the material for forming a single antireflection layer 5 include resin materials such as UV-curable acrylic resins; hybrid materials such as a dispersion of inorganic fine particles (such as colloidal silica) in a resin; and sol-gel materials using metal alkoxide such as tetraethoxysilane and titanium tetraethoxide. Any of these materials may be used together with a fluoro-compound for imparting anti-fouling surface properties. In terms of scratch resistance, low-refractive-index layer materials with a high content of an inorganic component tend to provide good performance, and sol-gel materials are particularly preferred. Partial condensates of sol-gel materials may be used.

The sol-gel fluoro-substance may be typically perfluoro-alkylalkoxysilane such as a compound represented by the general formula: $CF_3(CF_2)_nCH_2CH_2Si(OR)_3$, wherein R represents an alkyl group of 1 to 5 carbon atoms, and n represents an integer of 0 to 12. Specific examples include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. In particular, the compounds whose n is from 2 to 6 are preferred.

The low-refractive-index layer (the antireflection layer) is preferably produced with a hard-coating material that contains, as disclosed in JP-A No. 2004-167827, a siloxane oligomer with an ethylene glycol-equivalent number average molecular weight of 500 to 10000 and a fluorine compound having a polystyrene-equivalent number average molecular weight of at least 5000 and having a fluoroalkyl structure and a polysiloxane structure.

The low-refractive-index layer (the antireflection layer) may contain an inorganic sol for increasing film strength. While any inorganic sol material may be used such as silica, alumina, and magnesium fluoride, silica sol is particularly preferred. The amount of the inorganic sol is appropriately set within the range of 10 to 80 parts by weight, based on 100 parts of the total solids of the low-refractive-index-coating material. The particle size of the inorganic sol is preferably in the range of 2 to 50 nm, more preferably of 5 to 30 nm.

The material for forming the antireflection layer 5 preferably contains hollow spherical silicon oxide ultrafine particles. The hollow spherical silicon oxide ultrafine particles preferably have an average particle size of 5 to 300 nm. Such ultrafine particles are like hollow spheres each comprising a pore-containing outer shell in which a hollow is formed. The hollow may contain a solvent and/or a gas which are left after the fine particles are prepared. A precursor substance for forming the hollow is preferably left in the hollow. The thickness of the outer shell is preferably in the range of about 1 to about 50 nm and in the range of 1/50 to 1/5 of the average particle size. The outer shell preferably comprises a plurality of coating layers. The pore is preferably blocked, and the hollow is preferably sealed with the outer shell. The antireflection layer 5 holding a porous structure or a hollow can have a reduced refractive index and thus is preferably used.

The hollow spherical silicon oxide ultrafine particles should have an average particle size of about 5 to about 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

For example, a method of producing hollow spherical silicon oxide ultrafine particles includes the steps (a) to (c) as described below. The hollow spherical silicon oxide ultrafine particles may be prepared in the form of a dispersion. For example, the method of producing such hollow spherical silicon oxide ultrafine particles is preferably a method of producing silica fine particles as disclosed in JP-A No. 2000-233611.

Specifically, the method includes the step of:
(a) simultaneously adding an aqueous silicate solution and/or an acidic silicic acid solution and an aqueous solution of an alkali-soluble inorganic compound to an aqueous alkali solution with a pH of 10 or more or an aqueous alkali solution with a pH of 10 or more in which seed particles are optionally dispersed, in order to form a dispersion of core particles with a $MO_x/SiO_2$ molar ratio of 0.3 to 1.0, wherein $SiO_2$ represents silicon oxide, and $MO_x$ represents inorganic compounds other than silicon oxide;
(b) adding a source of silicon oxide to the dispersion of core particles to form a first silicon oxide coating layer on the core particles; and
(c) adding an acid to the dispersion so as to partially or entirely remove an element constituting the core particles.

In the invention, the hollow spherical silicon oxide ultrafine particles should have an average particle size of 5 to 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

A dispersion of the hollow spherical silicon oxide ultrafine particles may be mixed with any type of matrix component to form an antireflection coating liquid. The term "any type of matrix component" refers to any component capable of forming a coating film on the surface of the hard-coating layer. The matrix may be selected and used from resins and the like satisfying the requirements for adhesion to the substrate, hardness, coating properties, and the like. Examples of such a matrix include conventional organic resins such as polyester resins, acrylic resins, urethane resins, vinyl chloride resins, epoxy resins, melamine resins, fluororesins, silicone resins, butyral resins, phenol resins, vinyl acetate resins, UV-curable resins, electron beam-curable resins, emulsion resins, water-soluble resins, hydrophilic resins, any mixtures thereof, any copolymers thereof, and any modifications thereof. The hydrolyzable organic silicon compounds as illustrated for the single antireflection layer 5 may also be used as the matrix component.

When the organic resin is used as the matrix component, for example, the matrix and an organic solvent dispersion of hollow spherical silicon oxide ultrafine particles, which uses an organic solvent such as an alcohol in place of water as a dispersion medium, or the matrix and an organic solvent dispersion of the ultrafine particles which has been optionally treated with any conventional coupling agent are diluted with any appropriate organic solvent to form an antireflection coating liquid.

When the hydrolyzable organic silicon compound is used as the matrix component, for example, water and a catalyst of an acid or alkali are added to a liquid mixture of an alkoxysilane and an alcohol to form a partially hydrolyzed product of the alkoxysilane, which is then mixed with the above-mentioned dispersion and optionally diluted with an organic solvent to form a coating liquid.

In the coating liquid, the weight ratio of the silicon oxide ultrafine particles to the matrix component is preferably in the range of 1:99 to 9:1. If the weight ratio exceeds 9:1, the antireflection layer can be insufficient in strength and impractical in some cases. If the weight ratio is less than 1:99, the addition of the silicon oxide ultrafine particles cannot be so effective in some cases.

The refractive index of the antireflection layer 5 formed on the surface of the hard-coating layer 2 may be as low as from 1.2 to 1.42 depending on the mixture ratio between the silicon oxide ultrafine particles and the matrix component or the like and the refractive index of the matrix used. The refractive index of the silicon oxide ultrafine particles themselves may be from 1.2 to 1.38 in the invention.

The hard-coated antireflection film having the antireflection layer 5 formed on the hard-coating layer 2 of the hard-coated film is preferred in terms of pencil hardness. The surface of the ultrafine particle-containing hard-coating layer 2 has fine unevenness, which may have an effect on pencil drawing (the pencil can tend to scratch the surface, and the force can tend to be exerted). If the antireflection layer 5 is provided, the unevenness can be smoothed out, and the pencil hardness of the hard-coating layer can be increased from a usual value (such as about 3H) to 4H.

For example, the hollow spherical silicon oxide ultrafine particles are preferably prepared using the method of producing silica fine particles as disclosed in JP-A No. 2000-233611.

In the process of forming the low-refractive-index layer, while drying and curing may be performed at any temperature, they are generally performed at a temperature of 60 to 150° C., preferably of 70 to 130° C., generally for a time period of 1 minute to 30 minutes, more preferably of about 1 minute to about 10 minutes in view of productivity. After drying and curing, the layer may be further heated so that a hard-coated antireflection film of high hardness can be obtained. While the heating may be performed at any temperature, it is generally performed at a temperature of 40 to 130° C., preferably of 50 to 100° C., generally for a time period of 1 minute to 100 hours, more preferably of at least 10 hours in terms of further increasing scratch resistance. The temperature and the time period are not limited to the above range and may be adjusted as needed. The heating is appropriately performed by a method using a hot plate, an oven, a belt furnace, or the like.

The antireflection layer 5 may be more frequently attached to the uppermost surface of image displays and thus tends to receive stains from the external environment. Particularly, general stains such as fingerprint, thumbmark, sweat, and hair dressing are frequently left. The stain deposit can change the surface reflectance or stand out whitely to make the displayed content unclear. Such stains can be more noticeable on the layer than on a simple transparent plate or the like. In such a case, a fluoro-silane compound, a fluoro-organic compound or the like may be layered on the antireflection layer 5 in order to impart the function of anti-deposition or easy elimination.

Any type of surface treatment may be performed on the film substrate 1 or the hard-coating layer 2 formed on the film substrate 1 so as to increase the adhesion between the film substrate 1 and the hard-coating layer 2 or between the film substrate 1, the polarizer or the hard-coating layer 2, and the antireflection layer 5. The surface treatment may be low-pressure plasma treatment, ultraviolet radiation treatment, corona treatment, flame treatment, or acid or alkali treatment. When triacetyl cellulose is used for the film substrate, alkali saponification treatment as specifically described below is preferably used. The surface of the cellulose ester film is preferably subjected to cycles of immersing in an alkali solution and then washing with water and drying. The alkali solution may be a potassium hydroxide solution or a sodium hydroxide solution, and the normal concentration of the hydroxide ion is preferably from 0.1 N to 3.0 N, more preferably from 0.5 N to 2.0 N. The temperature of the alkali solution is preferably in the range of 25° C. to 90° C., more preferably of 40° C. to 70° C. Thereafter, washing with water and drying are performed so that surface-treated triacetyl cellulose can be obtained.

For the purpose of preventing curling, the back surface of the film substrate 1 (the surface opposite to the surface on which the hard-coating layer 2 is formed) may be subjected to the solvent treatment as described below. The solvent treatment includes the step of applying, by any conventional method, a composition containing a solvent capable of dissolving or swelling the film substrate 1. If such a solvent is applied, the film substrate 1 can have a tendency to curl toward the back side, which can cancel the force allowing the film substrate 1 with the hard-coating layer 2 to curl toward the hard-coating layer 2 side and thus prevent curling.

The solvent may be a dissolving solvent and/or a swelling solvent or a mixture thereof, and the solvent may further contain a solvent incapable of dissolving the substrate. A composition thereof with an appropriate mixture ratio is applied in an appropriate amount depending on the degree of curling of the film substrate 1 and the type of the resin.

In order to enhance the function of preventing curling, the content of the solvent capable of dissolving and/or swelling in the mixture composition can be effectively increased, and that of the solvent incapable of dissolving can be effectively decreased. The mixture ratio of the solvent capable of dissolving and/or swelling to the solvent incapable of dissolving is preferably from 10:0 to 1:9. Examples of the solvent capable of dissolving or swelling transparent resin films for such a mixture composition include benzene, toluene, xylene, dioxane, acetone, methyl ethyl ketone, N,N-dimethylformamide, methyl acetate, ethyl acetate, trichloroethylene, methylene chloride, ethylene chloride, tetrachloroethane, trichloroethane, and chloroform. Examples of the solvent incapable of dissolving include methanol, ethanol, n-propyl alcohol, isopropyl alcohol, and n-butanol.

The solvent composition may be applied onto the surface of the film substrate 1 with a gravure coater, a dip coater, a reverse coater, or an extrusion coater so as to provide a wet film thickness (a film thickness before drying) of 1 to 100 µm, more preferably of 5 to 30 µm.

Each solvent applied in such a manner may be dispersed out after drying, or a very small amount of each solvent may remain. In a preferred mode, however, no solvent remain on the applied surface.

In order to prevent curling, the transparent resin layer as described below may also be formed on the back surface of the film substrate 1 (the surface opposite to the surface on which the hard-coating layer 2 is formed). For example, the transparent resin layer is mainly composed of a thermoplastic resin, a radiation-curable resin, a thermosetting resin, or any other reactive resin. In particular, the layer mainly composed of a thermoplastic resin is preferred.

Examples of the thermoplastic resin include vinyl polymers or copolymers such as vinyl chloride-vinyl acetate copolymers, vinyl chloride resins, vinyl acetate resins, vinyl acetate-vinyl alcohol copolymers, partially hydrolyzed vinyl chloride-vinyl acetate copolymers, vinyl chloride-vinylidene chloride copolymers, vinyl chloride-acrylonitrile copolymers, ethylene-vinyl alcohol copolymers, chlorinated polyvinyl chloride, ethylene-vinyl chloride copolymers, and ethylene-vinyl acetate copolymers; cellulose derivatives such as nitrocellulose, cellulose acetate propionate, and cellulose acetate butyrate resins; copolymers of maleic acid and/or acrylic acid, acrylate ester copolymers, acrylonitrile-styrene copolymers, chlorinated polyethylene, acrylonitrile-chlorinated polyethylene-styrene copolymers, methyl methacrylate-butadiene-styrene copolymers, acrylic resins, polyvinyl acetal resins, polyvinyl butyral resins, polyester polyurethane resins, polyether polyurethane resins, polycarbonate polyurethane resins, polyester resins, polyether resins, polyamide resins, amino resins, rubber resins such as styrene-butadiene reins and butadiene-acrylonitrile resins, silicone resins, and fluororesins. Among these thermoplastic resins, cellulose resins such as diacetyl cellulose are particularly preferably used for the transparent resin layer.

The film substrate 1 side of the hard-coated antiglare film 4 or the hard-coated antireflection antiglare film 6 is generally bonded to an optical component for use in a LCD or ELD via a pressure-sensitive adhesive or an adhesive. Before the bonding, the film substrate 1 may also be subjected to the surface treatment as described above.

For example, the optical component is a polarizer or a polarizing plate. A polarizing plate comprising a polarizer and a transparent protective film formed on one or both sides of the polarizer is commonly used. If the transparent protective film is formed on both sides of the polarizer, the front and rear transparent protective films may be made of the same material or different materials. Polarizing plates are generally placed on both sides of a liquid crystal cell. Polarizing plates may be arranged such that the absorption axes of two polarizing plates are substantially perpendicular to each other.

Referring to an example of the polarizing plate, a description is then provided of an optical device in which the hard-coated film or hard-coated antireflection film of the invention is stacked. The hard-coated antiglare film 4 or hard-coated antireflection antiglare film 6 of the invention and a polarizer or polarizing plate may be laminated with an adhesive or a pressure-sensitive adhesive to form a polarizing plate having the function according to the invention.

The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

The transparent protective film formed on one or both sides of the polarizer preferably has good transparency, mechanical strength, thermal stability, moisture-blocking properties, retardation value stability, or the like. Examples of the material for the transparent protective film include polyester resins such as polyethylene terephthalate and polyethylene naphthalate; cellulose resins such as diacetyl cellulose and triacetyl cellulose; acrylic resins such as poly(methyl methacrylate); styrene-based resins such as polystyrene, acrylonitrile-styrene copolymers, styrene resins, acrylonitrile-styrene resins, acrylonitrile-butadiene-styrene resins, acrylonitrile-ethylene-styrene resins, styrene-maleimide copolymers, and styrene-maleic anhydride copolymers; and polycarbonate resins. The transparent protective film may be a polymeric film made of a polyolefin resin such as a cycloolefin resin, a norbornene resin, polyethylene, polypropylene, and an ethylene-propylene copolymer, a vinyl chloride resin, an amide resin such as nylon and aromatic polyamide, an imide resin such as aromatic polyimide and polyimide amide, a sulfone resin, a polyethersulfone resin, a polyetheretherketone resin, a polyphenylene sulfide rein, a vinyl alcohol resin, a vinylidene chloride resin, a vinyl butyral resin, an allylate resin, a polyoxymethylene resin, an epoxy resin, or any blend of the above resins. The transparent protective film may also be formed by curing a layer of a thermosetting or UV-curable resin such as an acrylic resin, a urethane resin, an acrylic urethane resin, an epoxy resin, and a silicone resin.

Moreover, as is described in Japanese Patent Laid-Open Publication No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. These-films exhibit small retardations and small photoelastic coefficients and thus can eliminate defects such as unevenness due to distortion when used in a protective film for a polarizing plate or the like. These films also have low moisture permeability and thus have high durability against moistening.

In terms of polarizing properties, durability and the like, cellulose resins such as triacetyl cellulose and norbornene resins are preferably used for the transparent protective film. Specific examples of such resins include FUJITAC (trade name) manufactured by Fuji Photo Film Co., Ltd., ZEONOA (trade name) manufactured by Nippon Zeon Co., Ltd. and ARTON (trade name) manufactured by JSR Corporation.

A thickness of the transparent protective film is determined appropriately, and in general, it is approximately 1 to 500 μm so that it may have suitable thinness, or in viewpoint of workability, such as strength and handling property. Especially it is preferably 5 to 200 μm, and more preferably 10 to 150 μm. In the above range, the transparent protective film can mechanically protect a polarizer and can prevent a polarizer from shrinking and retain stable optical properties even when exposed to high temperature and high humidity.

It is preferred that the degree of the coloration of the transparent substrate film is as little as possible. Accordingly, it is preferred to use a protective film wherein a phase difference value in the film thickness direction, which is represented by $Rth=(nx-nz) \cdot d$ wherein nx represent refractive indexes of the film of the slow axis direction in its plane, nz represents a refractive index of the film in the thickness direction thereof, and d represents a thickness of the film, is from −90 to +75 nm. The use of the film wherein the phase difference value (Rth) in the thickness direction is from −90 nm to +75 nm makes it possible to overcome substantially the coloration (optical coloration) of the polarizing plate, resulting from the protective film. The phase difference value (Rth) in the thickness direction is more preferably from −80 nm to +60 nm, more preferably from −70 nm to +45 nm.

The in-plane retardation value of the transparent protective film and the retardation value in the thickness direction of the transparent protective film can affect the viewing angle properties of liquid crystal displays. Thus, it is preferable to use a transparent protective film with an optimized retardation value. It should be noted that the transparent protective film stacked on a polarizer surface close to a liquid crystal cell should have an optimized retardation value, while that stacked on a polarizer surface far away from the liquid crystal cell does not affect the optical properties of the liquid crystal display and thus does not need to have an optimized retardation value.

The transparent protective film stacked on a polarizer surface close to a liquid crystal cell preferably has an in-plane retardation value (Re: $(nx-ny) \cdot d$) of 0 to 5 nm, more preferably of 0 to 3 nm, still more preferably of 0 to 1 nm. Its retardation value in its thickness direction (Rth) is preferably from 0 to 15 nm, more preferably from 0 to 12 nm, still more preferably from 0 to 10 nm, particularly preferably from 0 to 5 nm, most preferably from 0 to 3 nm.

The polarizing plate in which the hard-coated film or the like is stacked may be a laminate of the hard-coated film or the like, the transparent protective film, the polarizer, and the transparent protective film in this order or a laminate of the hard-coated film or the like, the polarizer and the transparent protective film in this order.

In addition, the transparent protective film surface to which the polarizer is not bonded may be provided with a hard-coating layer or subjected to anti-sticking treatment. The hard-coating treatment is performed in order to prevent scratching of the polarizing plate surface. In the process of forming the hard-coating layer, for example, a cured film with high hardness, good sliding characteristics and the like may be formed on the surface of the transparent protective film by using an appropriate UV-curable resin such as an acrylic resin and a silicone resin. The anti-sticking treatment is performed in order to prevent adhesion to the adjacent layer. The hard-coating layer, the anti-sticking layer or the like may be formed as being the transparent protective film itself or may be provided as an independent optical layer separately from the transparent protective film.

A hard-coating layer, a primer layer, an adhesive layer, a pressure-sensitive adhesive layer, an antistatic layer, an electrically-conductive layer, a gas barrier layer, a water vapor-blocking layer, a moisture-blocking layer, or the like may also be placed between the layers of a polarizing plate or on the surface of a polarizing plate. At the stage of forming each layer of the polarizing plate, electrically-conductive particles, an antistatic agent, various types of fine particles, a plasticizer, or the like may also be added to or mixed with the material for each layer to modify it as needed.

Any method may be used to laminate the transparent protective film and the polarizer. For example, the protective film and the polarizer may be laminated through an adhesive comprising an acrylic polymer or a vinyl alcohol polymer or an adhesive comprising at least a water-soluble crosslinking agent for a vinyl alcohol polymer, such as boric acid, borax, glutaraldehyde, melamine, and oxalic acid, so that the resulting protective layer can be resistant to peeling due to humidity or heat and can have high light transmittance or high degree of polarization. A polyvinyl alcohol adhesive is preferably used because of its good adhesion to the polarizer material, polyvinyl alcohol.

Pressure-sensitive adhesives that have high transparency and low birefringence and can exhibit sufficient adhesive strength in the form of a thin layer are preferably used to laminate the polarizer and the transparent protective film of the norbornene resin-containing polymer film. Such a pressure-sensitive adhesive may be a dry laminating adhesive using a mixture of a polyurethane resin solution and a polyisocyanate resin solution, a styrene-butadiene rubber adhesive, or a two-part curable epoxy adhesive such as two components of an epoxy resin and polythiol and two components of an epoxy resin and polyamide. In particular, solvent type adhesives or two-part curable epoxy adhesives are preferred, and transparent adhesives are preferred. The adhesive force can be improved using an appropriate adhesive primer depending on the type of adhesives, and in the case of using such an adhesive, a certain adhesive primer is preferably used.

Any adhesive primer may be used as long as its layer can improve the adhesion properties. For example, the adhesive primer may be a so-called coupling agent such as a silane coupling agent having a hydrolyzable alkoxysilyl group and a reactive functional group such as amino, vinyl, epoxy, mercapto, and chloro in the same molecule, a titanate coupling agent having an organic functional group and a titanium-containing hydrolyzable hydrophilic group in the same molecule, and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, the silane coupling agent-containing layer is preferred, because it is easy to handle industrially.

An adhesive or pressure-sensitive adhesive layer is preferably formed on one or both sides of the polarizing plate so that it can be easily stacked on a liquid crystal cell.

Any adhesive or pressure-sensitive adhesive may be used to form the adhesive or pressure-sensitive adhesive layer. For example, the base polymer for use in the adhesive is appropriately selected from acrylic polymers, silicone polymers, polyesters, polyurethanes, polyamides, polyvinyl ethers, vinyl acetate-vinyl chloride copolymers, modified polyolefins, and rubber polymers such as epoxy rubbers, fluororubbers, natural rubbers, and synthetic rubbers. In particular, acrylic pressure-sensitive adhesives are preferably used, because they have good optical transparency and good weather or heat resistance and exhibit suitable adhesion properties such as suitable wettability, cohesiveness, and adhesiveness.

The adhesive or pressure-sensitive adhesive may contain a crosslinking agent depending on its base polymer. If necessary, the pressure-sensitive adhesive layer may contain appropriate additives such as fillers or pigments of natural or synthetic resins, glass fibers or beads, or metal powder or any other inorganic powder, colorants, and antioxidants. The pressure-sensitive adhesive layer may also contain transparent fine particles so as to have light diffusion properties.

The transparent fine particles may have an average particle size of 0.5 to 20 μm and may comprise one or more of silica, calcium oxide, alumina, titania, zirconia, electrically-conductive inorganic fine particles of tin oxide, indium oxide, cadmium oxide, antimony oxide, or the like, and crosslinked or uncrosslinked organic fine particles of an appropriate polymer such as poly(methyl methacrylate) and polyurethane.

The adhesive or pressure-sensitive adhesive is generally used in the form of a solution with a solids content of about 10 to 50% by weight, which comprises a base polymer or composition thereof dissolved or dispersed in a solvent. The solvent may be appropriately selected and used from organic solvents such as toluene and ethyl acetate and water depending on the type of the adhesive.

A laminate of different compositions or types of adhesives or pressure-sensitive adhesives may be formed on one or both sides of a polarizing plate or an optical film. The thickness of the adhesive or pressure-sensitive adhesive may be appropriately determined depending on the intended purpose and adhesive force and is generally from 1 to 500 μm, preferably from 5 to 200 μm, particularly preferably from 10 to 100 μm.

The surface of the adhesive or pressure-sensitive adhesive layer to be exposed is temporarily bonded to and covered with a release paper or a release film (also referred to as a separator) until use. This prevents the adhesive or pressure-sensitive adhesive layer from being touched during usual handling. The separator may be any appropriate conventional thin material such as a plastic film, a rubber sheet, a paper material, a fabric, a non-woven fabric, a net, a foamed sheet, a metal foil, and a laminate thereof, which are optionally coated with an appropriate release agent such as a silicone release agent, a long-chain alkyl release agent, a fluoro-release agent, and molybdenum sulfide.

An optical device is an optical film that the polarizing plate can be laminated with an additional optical layer thereon in a practical use. No specific limitation is placed on an additional optical layer, and there can be used one optical layer, or two optical layers or more that is used in formation of a liquid crystal display or the like such as a retardation plate (including ½ or ¼ wavelength plate). Especially preferable is a polarizing plate obtained by further laminating a brightness enhancement film on a polarizing plate. In particular, a reflection type polarizing plate or a semipermeation-type polarizing plate in which a reflection plate or a semipermeation reflection plate is further laminated on a polarizing plate, an elliptic polarizing plate or a circular polarizing plate in which a phase difference plate is laminated on a polarizing plate, a wide field angle polarizing plate in which a visual angle compensating film is further laminated on a polarizing plate, or a polarizing plate in which a luminance improving film (polarization split film having a polarization selection layer, D-BEF and others manufactured by 3M Co., Ltd.) is further laminated on a polarizing plate is preferable. When it is used the elliptic polarizing plate, or the polarizing plate having optical compensation, the hard-coated film is formed in the side of the polarizing plate.

Furthermore, if needed, there may also be given treatments for giving various characteristics, various functions, etc., such as scratch-proof property, durability, weatherability, wet heat resistance, heat resistance, moisture resistance, water vapor permeability, antistatic property, conductivity, improvement in adhesion between layers, and improvement in mechanical strength, or insertion, lamination of functional layers, etc.

A reflection-type polarizing plate is a plate in which a reflection layer is provided on a polarizing plate, is for forming a liquid crystal display device which is a type of reflecting and displaying incident light from a visible side (display side), and has an advantage that building-in of a light source such as back light can be omitted, and a liquid crystal display device is easily thinned. Formation of a reflection-type polarizing plate can be performed by an appropriate format such as a format of providing a reflection layer comprising a metal on one side of a polarizing plate via a transparent protecting layer, if necessary.

As an example of a reflective type polarizing plate, a plate may be mentioned on which, if required, a reflective layer is formed using a method of attaching a foil and vapor deposition film of high-reflectance metals, such as aluminum, to one side of a matte treated protective film.

A reflection plate may be used by a reflection sheet on which a reflection layer is provided on an appropriate film like a transparent protecting film in place of a format of directly imparting to the transparent film of a polarizing plate. Since a reflection layer is usually made of a metal, a use aspect in the state where its reflection side is covered with a transparent protecting film or a polarizing plate is more preferable from a viewpoint of prevention of reduction in a reflectivity due to oxidation, consequently long term durability of an initial reflectivity, and avoidance of separate provision of a protecting layer.

A semi-permeation polarizing plate can be obtained by adopting a semi-permeation type reflection layer such as a half mirror which reflects light on a reflection layer and permeates light in the aforementioned plate. The semi-permeation polarizing plate is usually provided on a back side of a liquid crystal cell, and such a type of a liquid crystal display device can be formed that, when a liquid crystal display device is used in the relatively light atmosphere, incident light from a visible side (display side) is reflected to display an image and, in the relatively dark atmosphere, an image is displayed using a built-in light source such as back light built in a back side of a semi-permeation polarizing plate. That is, the semi-permeation polarizing plate is useful for forming such a type of a liquid crystal display device that energy which is used in a light source such as back light can be saved, and the device can be used using a built-in light source also under the relatively dark atmosphere.

An elliptic polarizing plate or a circular plate in which a phase difference plate is further laminated on a polarizing plate will be explained. When a linearly polarized light is changed to elliptically polarized light or a circularly polarized light, or elliptically polarized light or circularly polarized light is changed to linearly polarized light, or a polarization direction of linearly polarized light is changed, a phase difference plate is used. In particular, as a phase difference plate for changing linearly polarized light to circularly polarized light, or changing circularly polarized light to linearly polarized light, a so-called ¼ wavelength plate (also referred to as λ/4 plate) is used. A ½ wavelength plate (also referred to as λ/2 plate) is usually used when a polarization direction of linearly polarized light is changed.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflective type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The aforementioned elliptic polarizing plate or reflection-type elliptic polarizing plate is such that an appropriate combination of a polarizing plate or a reflection-type polarizing plate and a phase difference plate is laminated. Such the elliptic polarization plate can be formed by successively and separately laminating a (reflection-type) polarizing plate and a phase difference plate in a process for manufacturing a liquid crystal display device so that a combination of the (reflection-type) polarizing plate and the phase difference plate is obtained, and an optical member such as an elliptic polarizing plate which has been formed in advance as described above has an advantage that it is excellent in stability of quality and laminating workability, and an efficiency of manufacturing a liquid crystal display device can be improved.

A visual angle compensating film is a film for extending a field angle so that an image is seen relatively clearly even when a screen of a liquid crystal display device is seen not from a direction vertical to the screen but from a slightly slant direction. Such the visual angle compensating phase difference plate is such that an orientation layer of a liquid crystal polymer is supported on a phase difference plate, an oriented film such as a liquid crystal polymer, or a transparent substrate. In a normal phase difference plate, a polymer film having birefringence which has been monoaxially stretched in its surface direction is used, while in a phase difference plate used as a visual angle compensating film, a bidirectional stretched film such as a polymer film having birefringence which has been biaxially stretched in a surface direction, a polymer having birefringence which has been monoaxially stretched in a surface direction, is also stretched, and also stretched in a thickness direction, and has a controlled refractive index in a thickness direction, and a slantly oriented film is used. Examples of the slantly oriented film include a film obtained by adhering a thermally shrinking film to a polymer film, and subjecting the polymer film to stretching treatment or/and shrinking treatment under action of a shrinking force due to heating, and a film in which a liquid crystal polymer is slantly oriented. As a raw material polymer for a phase difference plate, the same polymer as that explained for the previous phase difference plate is used, and an appropriate polymer for the purpose of preventing coloration due to change in a visual confirmation angle based on a phase difference due to a liquid crystal cell, or extending a field angle for better visual confirmation can be used.

In addition, from a viewpoint of accomplishment of a wide field angle for better visual confirmation, an optical compensating phase difference plate in which an optically anisotropic layer comprising an oriented layer of a liquid crystal polymer, in particular, a slantly oriented layer of a discotic liquid crystal polymer is supported by a triacetylcellulose film can be preferably used.

A polarizing plate in which a polarizing plate and a luminance improving film are laminated is usually used by provision on a back side of a liquid crystal cell. The luminance improving film exhibits such the property that, when natural light is introduced by back light of a liquid crystal display device, or reflection from a back side, linearly polarized light having a prescribed polarization axis or circularly polarized light in a prescribed direction is reflected, and other light is permeated. In a polarizing plate in which the luminance improving film is laminated on a polarizing plate, light from a light source such as back light is introduced to obtain permeated light in the prescribed polarized state and, at the same time, light other than the aforementioned prescribed polarized state is reflected without permeation. Light reflected on a surface of this luminance improving film is inverted via a reflection layer provided on its rear side to introduce into the luminance improving film again, a part or all of this is permeated as light in the prescribed polarized state to increase an amount of light permeating through the luminance improving film and, at the same time, polarized light which is absorbed in a polarizer with difficulty is supplied to increase an amount of light which can be utilized in a liquid crystal display image display, thereby, a luminance can be improved. That is, when light is introduced through a polarizer from a back side of a liquid crystal cell by back light without using the luminance improving film, most of light having a polarization direction which is not consistent with a polarization axis of a polarizer is absorbed in a polarizer, and is not permeated through a polarizer. That is, different depending on property of a used polarizer, about 50% of light is absorbed in a polarizer, an amount of light which can be utilized in a liquid crystal image display is reduced by that portion, and an image is darkened. Since the luminance improving film does not introduce light having such a polarization direction that it is absorbed in a polarizer, into a polarizer, once reflects on the luminance improving film, and inverts the light via a reflection layer provided on its rear side to introduce into the luminance improving film again, these are repeated, and the luminance improving film makes only polarized light that a polarization direction of light reflecting and inverting between both of them becomes a polarization direction capable of permeating through a polarizer, permeate therethrough, supplies this to a polarizer, light such as back light can be effectively used for displaying an image of a liquid crystal display device, and a screen can be made bright.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflective type elliptically polarizing plate or a semi-transmission type elliptically polarizing plate, etc. in which the above-mentioned reflective type polarizing plate or a transflective type polarizing plate is combined with above described retardation plate respectively.

Although a laminating of the above described hard coat film to the optical device may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

At least one layer of the polarizing plate mentioned above and the optical film element is laminated with the hard coat film. And on the other layer not prepared the hard coat film, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to the optical device or the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

The hard-coated antiglare film of the invention may be also used as a surface-treatment film for an anti-glass-breaking laminate. The anti-glass-breaking laminate may comprise an optical film for a liquid crystal display, an anti-glass-breaking pressure-sensitive adhesive layer provided on one side of the optical film through an undercoating layer, and the surface-treatment film provided on the pressure-sensitive adhesive layer. The anti-glass-breaking pressure-sensitive adhesive layer may have a dynamic storage modulus G' of at most $1 \times 10^7$ Pa at 20° C. When used in the anti-glass-breaking laminate with such a structure, the hard-coated antiglare film of the invention can protect the glass substrate of a liquid crystal panel from cracking by external impact and prevent optical films for liquid crystals from peeling or lifting in endurance tests with heating, moistening or the like.

An optical device having the hard-coated film of the present invention may be preferably used for manufacturing various equipments, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

Preferred examples of the invention are illustratively described in detail below. Unless otherwise stated, the materials, contents and so on as shown in the examples are not intended to limit the scope of the invention in any way and are intended for illustration purposes only. In each example, "part or parts" and "%" are by weight, unless otherwise stated.

EXAMPLE 1

A mixture was prepared using the following materials: a urethane acrylate (hereinafter referred to as Component A) (100 parts of a urethane acrylate produced with pentaerythritol acrylate and hydrogenated xylene diisocyanate); polyol (meth)acrylate (hereinafter referred to as Component B) (49 parts of dipentaerythritol hexaacrylate (hereinafter referred to as Component B1 (monomer)), 24 parts of pentaerythritol triacrylate (hereinafter referred to as Component B2 (monomer)) and 41 parts of pentaerythritol tetraacrylate (hereinafter referred to as Component B3 (monomer)); and a (meth)acrylic polymer having an alkyl group containing at least two hydroxyl groups (hereinafter referred to as Component C) (59 parts of a (meth)acrylic polymer having a 2-hydroxyethyl group and a 2,3-dihydroxypropyl group, PC 1097 (trade name) manufactured by Dainippon ink and chemicals, Incorporated). A hard-coating material was prepared by diluting the mixture, 30 parts (based on the total amount of the resin components) of PMMA particles with an average particle size of 10 μm (refractive index: 1.49), 0.5 parts of a reactive leveling agent, and 5 parts of a polymerization initiator (Irgacure 184) with a mixed solvent of butyl acetate and ethyl acetate at a mixture ratio of 55:45 (the content of ethyl acetate in all the solvents: 45%) in such a manner that a solids content of 55% was obtained. The reactive leveling agent was a copolymer of dimethylsiloxane, hydroxypropylsiloxane, (6-isocyanate hexyl)isocyanuric acid, and an aliphatic polyester (6.3:1.0:2.2:1.0 in molar ratio).

The hard-coating material was applied with a bar coater onto a film substrate of an 80 μm-thick triacetyl cellulose film (refractive index: 1.48), and the coating film was dried by heating it at 100° C. for 1 minute. The coating film was then irradiated with ultraviolet light at an accumulated light intensity of 300 mJ/cm² by a metal halide lamp to be cured so that a hard-coating layer with a thickness of 20 μm was formed and a hard-coated antiglare film according to this example was prepared.

EXAMPLE 2

In this example, a hard-coated antiglare film was prepared using the process of Example 1 except that the addition amount of the PMMA particles was changed to 15 parts.

EXAMPLE 3

In this example, a hard-coated antiglare film was prepared using the process of Example 1 except that PMMA particles with an average particle size of 15 μm (refractive index: 1.49) were added in an amount of 30 parts and that the solids content was changed to 35%.

EXAMPLE 4

In this example, a hard-coated antiglare film was prepared using the process of Example 1 except that PMMA particles with an average particle size of 8 μm (refractive index: 1.49) were added in an amount of 30 parts and that the thickness of the hard-coating layer was changed to 16 μm.

EXAMPLE 5

In this example, a hard-coated antiglare film was prepared using the process of Example 1 except that the thickness of the hard-coating layer was changed to 16 μm.

EXAMPLE 6

In this example, a hard-coated antiglare film was prepared using the process of Example 1 except that the thickness of the hard-coating layer was changed to 29 μm.

EXAMPLE 7

In this example, a hard-coated antiglare film was prepared using the process of Example 1 except that PMMA particles with an average particle size of 15 μm (refractive index: 1.49) were added in an amount of 30 parts and that the thickness of the hard-coating layer was changed to 23 μm.

EXAMPLE 8

In this example, a hard-coated antiglare film was prepared using the process of Example 1 except that an antireflection layer was formed on the hard-coating layer.

The antireflection layer was formed as follows. A siloxane oligomer with ethylene glycol-equivalent average molecular weights of 500 to 10000 (COLCOAT N103 manufactured by COLCOAT Co., Ltd. with a solids content of 2% by weight) was provided as a material for forming the antireflection layer and measured for number average molecular weight. The measured number average molecular weight was 950. A fluorine compound having polystyrene-equivalent number average molecular weights of at least 5000 and a fluoroalkyl structure and a polysiloxane structure (Opstar JTA105 (trade name) manufactured by JSR Corporation, with a solids content of 5% by weight) was provided and measured for number average molecular weight. The measured polystyrene-equivalent number average molecular weight was 8000. JTA105A (manufactured by JSR Corporation, solids content: 5% by weight) was used as a curing agent.

Next, an antireflection layer-forming material was prepared by mixing 100 parts by weight of Opstar JTA105, 1 part by weight of JTA105A, 590 parts by weight of COLCOAT N103, and 151.5 parts by weight of butyl acetate. The antireflection layer-forming material was applied onto the hard-coating layer with a die coater so as to provide the same width as the hard-coating layer and then dried and cured by heating at 120° C. for 3 minutes to form the antireflection layer (a low-refractive-index layer with a thickness of 0.1 μm and a refractive index of 1.43).

EXAMPLE 9

In this example, a hard-coated antiglare antireflection film was prepared by forming an antireflection layer on the hard-coating layer of the hard-coated antiglare film as obtained in Example 1.

The antireflection layer was formed as follows. An antireflection layer-forming material was prepared by dispersing 100 parts of dipentaerythritol acrylate, 15 parts of a silicone polymer having a methacryloxypropyl group and a butyl group, 2.5 parts of hexanediol acrylate, 6 parts of a Lucirin type photopolymerization initiator, and hollow spherical silicon oxide ultrafine particles with a diameter of 60 nm surface-treated and made hydrophobic with a silane coupling agent having an acrylic group into a mixed solvent of IPA/MIBK/butyl cellosolve/toluene (80/9/10.5/0.5) in such a manner that a solids content of 3% was obtained. The antireflection layer-forming material was used to form the antireflection layer on the hard-coating layer by the same method as in Example 7.

EXAMPLE 10

A hard-coated antiglare film was first prepared using the process of Example 1. The coating liquid described below was then applied onto the triacetyl cellulose film surface to be hard-coated (the surface opposite to the hard coating layer-receiving surface) with a wire bar so as to provide a wet thickness of 20 μm and dried at 80° C. for 1 minute. The coating liquid employed a mixed solvent of acetone, ethyl acetate and isopropyl alcohol (IPA) (37:58:5).

EXAMPLE 11

In this example, a hard-coated antiglare film was first prepared using the process of Example 1. The coating liquid described below was then applied onto the triacetyl cellulose film surface to be hard-coated (the surface opposite to the hard coating layer-receiving surface) with a wire bar so as to provide a wet thickness of 20 μm and dried at 80° C. for 1 minute. The coating liquid was prepared by adding diacetyl cellulose to a mixed solvent of acetone, ethyl acetate and isopropyl alcohol (IPA) (37:58:5) in such a manner that a diacetyl cellulose solid content of 0.5% was obtained.

EXAMPLE 12

In this example, a hard-coated film was prepared using the process of Example 1 except that the hard-coating layer was formed using a hard-coating material that was produced with a mixed solvent of butyl acetate and ethyl acetate at a mixture ratio of 79:21 (the content of ethyl acetate in all the solvents: 21%) so as to have a solids content of 63% upon dilution.

EXAMPLE 13

In this example, a hard-coated antiglare antireflection film was prepared using the process of Example 10 except that a mixed solvent containing butyl acetate and methyl isobutyl ketone (MIBK) at a mixture ratio of 55:45 (the content of ethyl acetate in all the solvents: 45%) was used for the hard-coating material.

EXAMPLE 14

In this example, a hard-coated antiglare antireflection film was prepared using the process of Example 10 except that a mixed solvent containing butyl acetate and butyl alcohol at a mixture ratio of 55:45 (the content of ethyl acetate in all the solvents: 45%) was used for the hard-coating material.

EXAMPLE 15

In this example, a hard-coated antiglare film was prepared using the process of Example 1 except that the reactive leveling agent was not used.

COMPARATIVE EXAMPLE 1

A hard-coating material was prepared by diluting 100 parts of a urethane acrylate-based UV-curable resin, 15 parts of polystyrene particles with an average particle size of 3.5 μm (refractive index: 1.59), 0.5 parts of a leveling agent (trade name: MEGAFAC F-470N manufactured by Dainippon Ink and Chemicals, Incorporated), 2.5 parts of a synthetic smectite, and 5 parts of a polarization initiator (trade name: Irgacure 907) with a mixed solvent of butyl acetate and toluene (13:87) in such a manner that a solids content of 35% was obtained.

Next, the hard-coating material was applied with a bar coater onto a transparent plastic film substrate of an 80 μm-thick triacetyl cellulose film (refractive index: 1.48) to form a coating film. The coating film was dried by heating it at 100° C. for 1 minute. The coating film was then irradiated with ultraviolet light at an accumulated light intensity of 300 mJ/cm$^2$ by a metal halide lamp to be cured so that a hard-coating layer with a thickness of 5 μm was formed. As a result, a hard-coated antiglare film according to this comparative example was prepared.

COMPARATIVE EXAMPLE 2

In this comparative example, a hard-coated antiglare film was prepared using the process of Example 1 except that the addition amount of the PMMA particles was changed to 3 parts.

COMPARATIVE EXAMPLE 3

In this comparative example, a hard-coated antiglare film was prepared using the process of Example 1 except that the addition amount of the PMMA particles was changed to 70 parts.

COMPARATIVE EXAMPLE 4

In this comparative example, a hard-coated antiglare film was prepared using the process of Comparative Example 1 except that PMMA particles with an average particle size of 3 μm (refractive index: 1.49) was alternatively used as the fine particles and that the addition amount of the particles was changed to 30 parts.

Thickness of Hard-Coating Layer

A thickness gauge (microgauge type, manufactured by Mitutoyo Corporation) was used for measurement. Each hard-coated film with the hard-coating layer formed on the transparent film substrate was measured for thickness, and the thickness of the hard-coating layer was calculated by subtracting the thickness of the substrate from the measured thickness. The results are shown in Table 1.

Thickness of Antireflection Layer

An instantaneous multichannel photodetector system (MCPD-2000 (trade name) manufactured by Otsuka Electronics Co., Ltd.) was used, and the thickness was calculated from the waveform data of the resulting interference spectrum.

The resulting hard-coated antiglare films (including the hard-coated antiglare antireflection films) were subjected to the following evaluations. The results are shown in Table 1.

Haze

A haze meter (HR300 (trade name) manufactured by Murakami Color Research Laboratory) was used for measurement according to JIS K 7136 (1981 version, haze (cloudiness)). The results are shown in Table 1.

Glossiness

Glossiness was measured according to JIS K 7105 (1981) at a measurement angle of 60° with Digital Variable Gloss Meter UGV-5DP manufactured by Suga Test Instrument Co., Ltd.

Pencil Hardness

The surface on which the hard-coating layer of the hard-coated antiglare film was not formed was placed on a glass plate, and then the surface of the hard-coating layer (or the antireflection layer) was subjected to a pencil hardness test according to JIS K 5400 (with a load of 500 g). The results are shown in Table 1.

Scratch Resistance

The value corresponding to the degree of scratch resistance of the hard-coated antiglare film was determined by the following test procedure.
(1) The sample is cut into a piece of at least 25 mm width and at least 100 mm length. The piece is placed on a glass plate.
(2) Steel wool #0000 is uniformly attached onto a smooth cross section of a cylinder with a diameter of 25 mm. On the surface of the sample piece, the cylinder with the steel wool is allowed to move forward and backward 30 times at a rate of about 100 mm/second under a load of 1.5 kg, and then scratch resistance is visually evaluated using the following criteria:
○: no scratch
▲: small scratches with no influence on visibility
x: significant scratches and loss of visibility Center-Line Average Surface Roughness Ra and Average Tilt Angle θa The hard-coated antiglare film surface with no hard-coating layer was bonded to a glass plate manufactured by Matsunami Glass Ind., Ltd. (thickness: 1.3 μm) with a pressure-sensitive adhesive. According to JIS B 0601 (1994), Ra and θa values were then determined using a high-precision micro figure measuring instrument (trade name: Surfcorder ET4000 manufactured by Kosaka Laboratory Ltd).

Adhesion

The adhesion of the hard-coating layer to the film substrate was evaluated by performing the cross-cut adhesion test according to JIS K 5400. While the peeling test was performed 100 times, the number of detached portions of the hard-coating layer from the film substrate was counted. The results are shown in the form of the number of detached portions/100 in Table 1.

Reflectance

A black acrylic plate manufactured by Mitsubishi Rayon Co., Ltd. (thickness: 2.0 mm) was bonded with a pressure-sensitive adhesive about 20 μm in thickness to the hard-coated antiglare film surface on which no hard-coating layer was formed. The resulting laminate with no reflection from the bonded back side was measured for reflectance of the surface of the antireflection layer. The spectral reflectance (specular reflectance+diffuse reflectance) was measured using a spectrophotometer (UV2400PC with an 8°-inclined integrating sphere, manufactured by Shimadzu Corporation), and the reflectance was calculated according to the formula: C illuminant/total reflection index of 2° visual field (Y value). The results are shown in Table 1.

2. The hard-coated antiglare film according to claim 1, wherein the polyol (meth) acrylate comprises pentaerythritol triacrylate and pentaerythritol tetraacrylate.

3. The hard-coated antiglare film according to claim 1, further comprising at least one antireflection layer formed on the hard-coating layer.

4. The hard-coated antiglare film according to claim 3, wherein the antireflection layer contains hollow spherical silicon oxide ultrafine particles.

5. The hard-coated antiglare film according to claim 1, wherein it has a glossiness of 50 to 95 according to JIS K 7105.

6. An optical device, comprising: an optical component; and the hard-coated antiglare film according to claim 1 formed on at least one side of the optical component.

7. An image display, comprising the optical element according to claim 6.

8. A polarizing plate, comprising the hard-coated antiglare film according to claim 1.

9. An image display, comprising the polarizing plate according to claim 8.

TABLE 1

| | Film Thickness (μm) | Blending Amount of Fine Particles (parts) | Refractive Index of HC Layer | Particle Size (μm) | Refractive Index of Fine Particles | Relative Particle Size (%) | Haze | Glossiness | Pencil Hardness | Scratch Resistance | Ra (μm) | θa (°) | Reflectance (%) | Adhesion |
|---|---|---|---|---|---|---|---|---|---|---|---|---|---|---|
| Example 1 | 20 | 30 | 1.51 | 10 | 1.49 | 50 | 62.5 | 77 | 4H | ○ | 0.107 | 0.77 | 4 | 0/100 |
| Example 2 | 20 | 15 | 1.51 | 10 | 1.49 | 50 | 34.5 | 85.8 | 4H | ▲ | 0.098 | 0.45 | 4 | 0/100 |
| Example 3 | 20 | 30 | 1.51 | 15 | 1.49 | 75 | 37.6 | 60.4 | 4H | ○ | 0.22 | 0.94 | 4 | 0/100 |
| Example 4 | 16 | 30 | 1.51 | 8 | 1.49 | 50 | 47.8 | 68.1 | 4H | ○ | 0.101 | 1.02 | 4 | 0/100 |
| Example 5 | 16 | 30 | 1.51 | 10 | 1.49 | 63 | 39.9 | 64 | 4H | ○ | 0.123 | 1.13 | 4 | 0/100 |
| Example 6 | 29 | 30 | 1.51 | 10 | 1.49 | 34 | 61.5 | 69.4 | 5H | ○ | 0.11 | 0.88 | 4 | 0/100 |
| Example 7 | 23 | 30 | 1.51 | 15 | 1.49 | 65 | 35.2 | 63.4 | 5H | ○ | 0.165 | 1.06 | 4 | 0/100 |
| Example 8 | 20 | 30 | 1.51 | 10 | 1.49 | 50 | 61.0 | 79 | 4H | — | 0.105 | 0.75 | 2.5 | 0/100 |
| Example 9 | 20 | 30 | 1.51 | 10 | 1.49 | 50 | 61.0 | 78 | 4H | — | 0.103 | 0.74 | 2.5 | 0/100 |
| Example 10 | 20 | 30 | 1.51 | 10 | 1.49 | 50 | 62.5 | 77 | 4H | ○ | 0.107 | 0.77 | 4 | 0/100 |
| Example 11 | 20 | 30 | 1.51 | 10 | 1.49 | 50 | 62.5 | 77 | 4H | ○ | 0.107 | 0.77 | 4 | 0/100 |
| Example 12 | 20 | 30 | 1.51 | 10 | 1.49 | 50 | 64.0 | 82 | 4H | ○ | 0.105 | 0.75 | 4 | 100/100 |
| Example 13 | 20 | 30 | 1.51 | 10 | 1.49 | 50 | 52.2 | 86.9 | 4H | ○ | 0.112 | 0.54 | 4 | 70/100 |
| Example 14 | 20 | 30 | 1.51 | 10 | 1.49 | 50 | 50.5 | 73 | 4H | ○ | 0.135 | 0.75 | 4 | 100/100 |
| Example 15 | 20 | 30 | 1.51 | 10 | 1.49 | 50 | 47.4 | 74.5 | 4H | ▲ | 0.152 | 0.91 | 4 | 0/100 |
| Comparative Example 1 | 5 | 15 | 1.53 | 3.5 | 1.49 | 70 | 43.9 | 51.8 | 2H | x | 0.154 | 1.67 | 4 | 0/100 |
| Comparative Example 2 | 20 | 3 | 1.51 | 10 | 1.49 | 50 | 6.5 | 122.2 | 4H | ○ | 0.06 | 0.35 | 4 | 0/100 |
| Comparative Example 3 | 20 | 70 | 1.51 | 10 | 1.49 | 50 | 65.9 | 51.5 | 4H | x | 0.157 | 1.88 | 4 | 0/100 |
| Comparative Example 4 | 20 | 30 | 1.51 | 3 | 1.49 | 15 | 53.1 | 68.5 | 4H | x | 0.167 | 1.00 | 4 | 0/100 |

What is claimed is:

1. A hard-coated antiglare film, comprising:
   a transparent film substrate; and
   a hard-coating layer that contains fine particles and is formed on at least one side of the transparent film substrate, wherein
   the hard-coating layer has a thickness of 15 μm to 30 μm,
   the fine particles have an average particle size of 30% to 75% of the thickness of the hard-coating layer,
   the fine particles form unevenness with an average tilt angle θa value of 0.4° to 1.5° according to JIS B 0601; and
   the hard-coating layer is made from a material containing a urethane acrylate, a polyol (meth) acrylate and a (meth) acrylic polymer having an alkyl group containing at least two hydroxyl groups.

10. A polarizing plate, comprising a polarizer and the hard-coated antiglare film according to claim 1 formed on at least one side of the polarizer.

11. An image display, comprising the polarizing plate according to claim 10.

12. An image display, comprising: the hard-coated antiglare film according to claim 1.

13. The hard-coated antiglare film according to claim 1, wherein the fine particles are added in an amount of 2 to 70 parts by weight, based on 100 parts by weight of the hard-coating material.

14. The hard-coated antiglare film according to claim 1, wherein the hard-coating layer has a refractive index of 1.4 to 1.6, and the difference between the refractive indices of the fine particles and the hard-coating layer is less than 0.05.

15. The hard-coated antiglare film according to claim 1, wherein the difference d between the refractive indices of the film substrate and the hard-coating layer is 0.04 or less.

16. A method of manufacturing a hard-coated antiglare film comprising a transparent film substrate and a hard-coating layer formed on at least one side of the substrate, comprising the steps of:

preparing a hard-coating material, wherein fine particles having an average particle size of 30% to 75% of the thickness of the hard-coating layer are added to form the hard-coating material;

applying the hard-coating material to at least one side of the film substrate to form a coating film; and curing the coating film to form a hard-coating layer having a thickness of 15 μm to 30 μm and unevenness with an average tilt angle θa value of 0.4° to 1.5° according to JIS B 0601, wherein the fine particles form the unevenness;

wherein the hard-coating layer is made from a material containing a urethane acrylate, a polyol (meth) acrylate and a (meth) acrylic polymer having an alkyl group containing at least two hydroxyl groups.

17. The method of manufacturing a hard-coated antiglare film according to claim 16, wherein the hard-coating material uses a dilution solvent containing ethyl acetate.

18. The method of manufacturing a hard-coated antiglare film according to claim 17, wherein the content of the ethyl acetate is at least 20% by weight.

19. The method of manufacturing a hard-coated antiglare film according to claim 16, wherein the fine particles are added in an amount of 2 to 70 parts by weight, based on 100 parts by weight of the hard-coating material.

20. The method of manufacturing a hard-coated antiglare film according to claim 16, wherein the hard-coating layer has a refractive index of 1.4 to 1.6, and the difference between the refractive indices of the fine particles and the hard-coating layer is less than 0.05.

21. The method of manufacturing a hard-coated antiglare film according to claim 16, wherein the difference d between the refractive indices of the film substrate and the hard-coating layer is 0.04 or less.

* * * * *